Aug. 13, 1968     A. BOSCHI ET AL     3,396,555

TWIN-JOINT FOR RESILIENT TRANSMISSION OF TORQUE

Filed Feb. 3, 1967     5 Sheets-Sheet 1

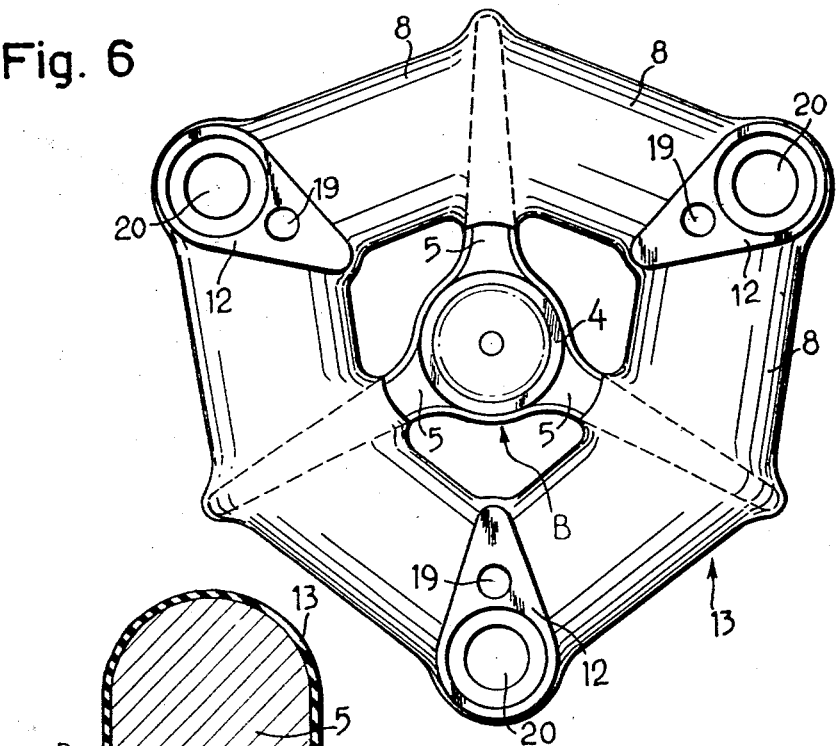
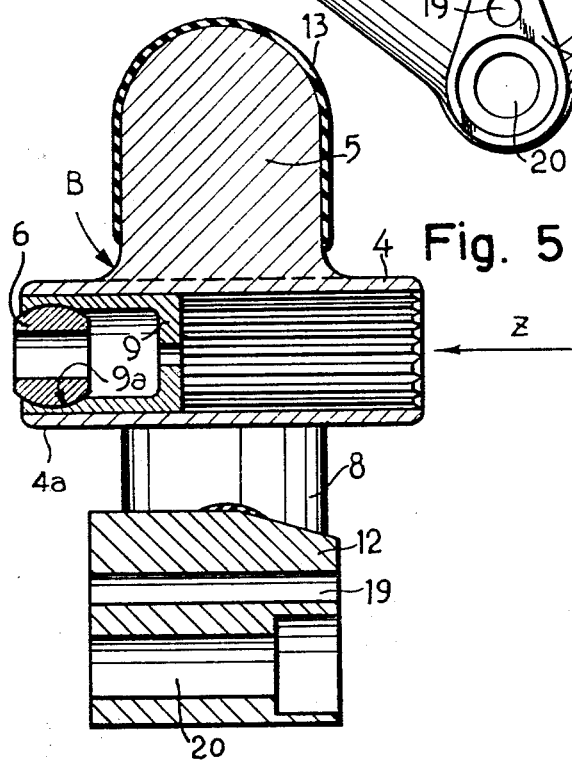

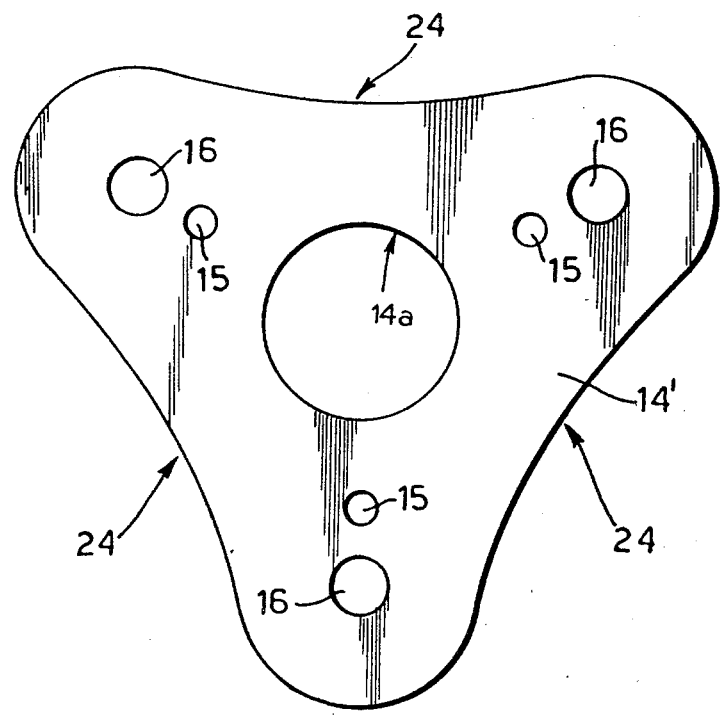

United States Patent Office 3,396,555
Patented Aug. 13, 1968

3,396,555
TWIN-JOINT FOR RESILIENT TRANSMISSION
OF TORQUE
Antonio Boschi and Giovanni Martorana, Milan, Italy, assignors to Società Applicazioni Gomma Antivibranti (SAGA) S.p.A.
Filed Feb. 3, 1967, Ser. No. 613,901
2 Claims. (Cl. 64—14)

ABSTRACT OF THE DISCLOSURE

Alternate apexes of a pair of co-axially arranged polygonal resilient component joints are removably rigidly connected to the opposed faces of a rigid disc or plate interposed between said component joints; the connections are established while subjecting said apexes to predetermined radially inwardly directed displacements thereby to introduce pre-compression stresses into the component joints.

---

This invention relates to resilient joints for transmission of torque, more particularly to a novel twin-joint structure.

It is an object of the invention to provide a robust, compact twin-joint structure capable of transmitting a comparatively high torque between a pair of shafts even in a strongly angled condition of the latter. An ancillary object of the invention is to provide a twin-joint structure particularly suitable for motor vehicles having widely swinging propeller-shaft sections and also for motor vehicles having relatively strongly angled propeller-shaft sections.

Another object of this invention is to provide a twin-joint structure comprising a reislient intermediary consisting of highly compressible and flexible pads of elastomeric material in a twin-polygonal arrangement about the axis of the joint, wherein each of the pads is precompressed in a direction parallel to the side of the polygon represented by the pad itself, thereby to avoid tensional stresses in the pads and yet to assure a correct and safe operation of the latter in angled condition of the joint.

A further important object of this invention is to provide the said twin-joint structure including unitary rubber-metal parts, capable of being easily manufactured and assembled together.

A still further object of the invention is to provide the said twin-joint structure including means causing the two resilient sections of the joint to operate in mutually balanced conditions between angled shafts.

Further objects and advantages of the invention will result from the following description.

According to an aspect of this invention, we provide a twin-joint for resilient transmission of torque comprising: a rigid plate perpendicular to the axis of the joint; a pair of spiders adjacent the opposite faces of the plate having vane-shaped spider arms, in an arrangement wherein each arm on a spider is aligned with its respective arm on the other spider in axial direction in the inoperative condition of the joint; a pair of through-apertures in the plate in a location angularly mid-way between each pair of mutually aligned spider-arms, the apertures in each pair of apertures extending on a common axial plane of the joint; a pair of rigid vane-blocks removably applied against the opposite faces of the plate in each of said locations to extend from their respective faces in axially opposite directions between the respective spider arms, the vane-blocks in each pair being formed with a pair of axially directed holes aligned with the respective apertures in the plate; means rigidly fastening each pair of vane-blocks to the plate, said means comprising a bolt screwed through a hole in a vane-block and through the respective aperture into the respective hole in the other vane-block in the pair thereby to clamp the plate between the vane-blocks, and a locking-pin extending from the remaining hole in a vane-block into its aligned hole in the other vane-block through the aperture in the plate aligned with the last-named holes whereby the vane-blocks in each pair are prevented from incidentally rotating about their clamping bolt; and a pair of polygonal rings of elastomeric material at the opposite sides of said plate for resiliently transmitting torque between their respective spiders and plate, each of said rings consisting of a polygonal series of elastomeric pads integrally moulded and vulcanized on the respective spider arms and vane-blocks whereby each of said spiders forms together with its associated pads and vane-blocks a unitary structure; each of said pads being pre-compressed between its respective spider arm and vane-block in the assembled condition of the joint; and said plate being relieved in zones between each pair of mutually aligned spider arms thereby to avoid interference between the plate and arms on angling of the joint.

According to a more specific aspect of the invention, we provide a twin-joint for resilient transmission of torque comprising: a rigid plate perpendicular to the axis of the joint; a pair of spiders adjacent the opposite faces of the plate having vane-shaped spider arms, in an arrangement wherein each arm on a spider is aligned with its respective arm on the other spider in axial direction in the inoperative condition of the joint; a pair of through-apertures in the plate in a location angularly mid-way between each pair of mutually aligned spider arms, the apertures in each pair of apertures extending on a common axial plane of the joint; a pair of rigid vane-blocks removably applied against the opposite faces of the plate in each of said locations to extend from their respective faces in axially opposite directions between the respective spider arms, the vane-blocks in each pair being formed with a pair of axially directed holes aligned with the respective apertures in the plate; means rigidly fastening each pair of vane-blocks to the plate, said means comprising a bolt screwed through a hole in a vane-block and through the respective aperture into the respective hole in the other vane-block in the pair thereby to clamp the plate between the vane-blocks, and a locking-pin extending from the remaining hole in a vane-block into its aligned hole in the other vane-block through the aperture in the plate aligned with the last-named holes whereby the vane-blocks in each pair are prevented from incidentally rotating about their clamping bolt; and a pair of polygonal rings of elastomeric material at the opposite sides of said plate for resiliently transmitting torque between their respective spiders and plate, each of said rings consisting of a polygonal series of elastomeric pads integrally moulded and vulcanized on the respective spider arms and vane-blocks whereby each of said spiders forms together with its associated pads and vane-blocks a unitary structure; each of said pads being pre-compressed between its respective spider arm and vane-block in the assembled condition of the joint, said plate being relieved in zones between each pair of mutually aligned spider arms thereby to avoid interference between the plate and arms on angling of the joint and being formed with a central aperture; a socket axially extending from one of the spiders into said central aperture, and a ball member in said socket carried by the other spider, said socket and ball member providing a mutual centering means for the spiders.

In the appended drawings:

FIGURE 5 is an axial sectional view of the other unitary section of the joint before assembly of the latter;

FIGURE 6 is an end view in direction Z of FIG. 5, showing the configuration of the polygonal ring before assembly of the joint;

FIGURE 7 is a plan view showing a modified shape of the plate interconnecting the two joint sections.

Figure 2:
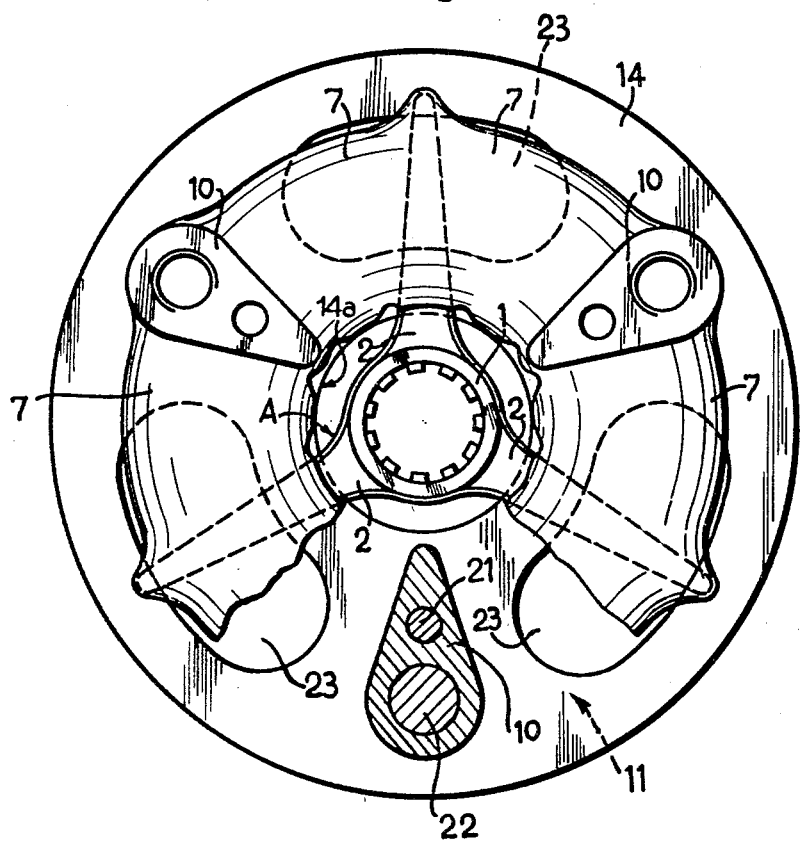
FIGURE 2 is an end view in direction X of FIG. 1.
Figure 4:
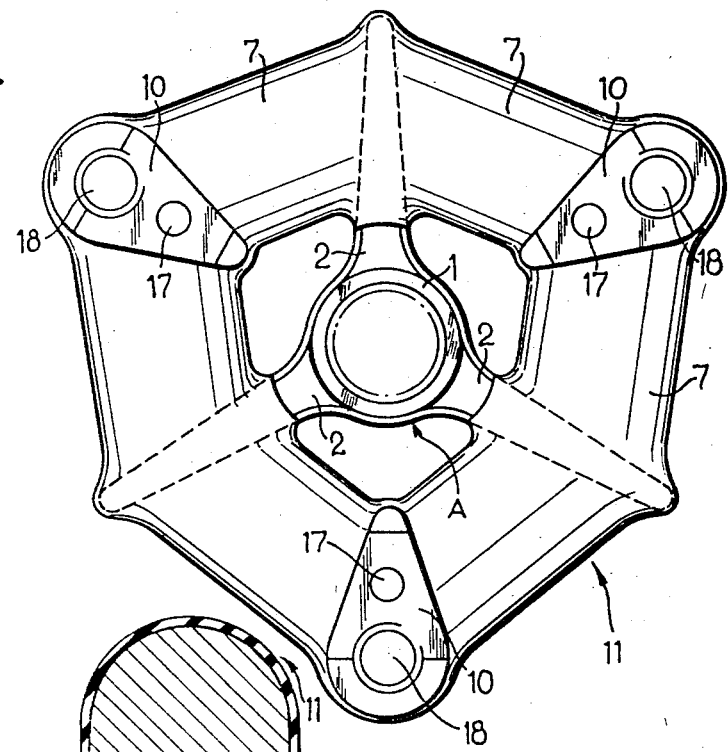
FIGURE 4 is an end view in direction Y of FIG. 3, showing the configuration of the polygonal ring before assembly of the joint.
Figure 3:
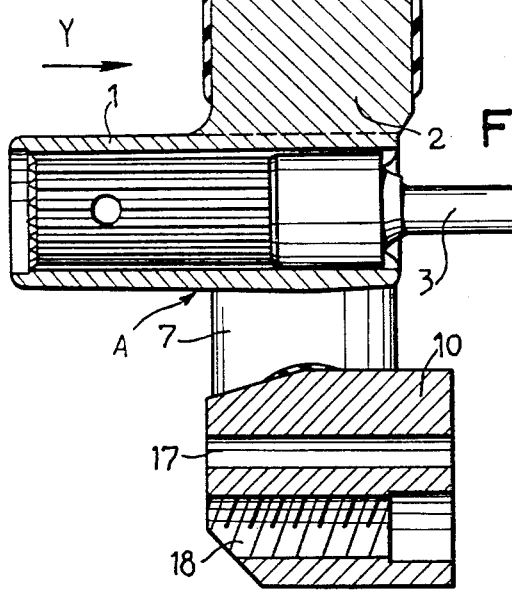
FIGURE 3 is an axial sectional view of one of the unitary sections of the joint before assembly of the latter.

The joint shown comprises a pair of metal spiders A, B, which are mutually axially aligned in the inoperative condition of the joint, said spiders comprising internally splined hubs 1, 4, respectively, integrally formed with three spider arms 2, 5, respectively. Each of the arms has a shape of a vane lying on an axial plane and the arms on each spider are angularly uniformly spaced about the axis of the joint. Advantageously, the thickness of the arms goes decreasing towards their free ends (see FIGS. 2, 4 and 6).

A cylindrical stud 3 is fixed in the bore in spider A and protrudes axially towards the spider B. On the other hand, the hub 4 of the spider B protrudes axially towards the spider A and the protruding portion 4a fixedly accommodates an axial socket 9, the latter being formed with a spherically curved annular seat 9a (FIG. 5) snugly accommodating a ball member 6. The member 6 is axially bored and, in the assembled condition of the joint, slidably and rotatably receives the stud 3.

In the assembled condition of the joint the spider arms on spider A are substantially aligned in axial direction with their corresponding arms on the spider B.

A rigid disc-shaped plate 14 is arranged between the two spiders A and B, concentrically with the ball 6 and is formed with a central hole 14a and windows 23 provided for permitting drawing together of the ends of the arms of the spiders A, B in an angled condition of the joint without interfering with the plate.

Three pairs of apertures 15, 16 are formed in the plate 14 and have their centres situated on two concentrical circumferences, the holes 15 being each radially aligned with one hole 16 in a plane bisecting the angle between the consecutive spider arms.

11, 13 denote two hexagonal rings each formed by a set of six rubber pads 7, 8, respectively, arranged along the sides of a hexagon.

Alternate apexes of the ring 11 are connected with the arms 2 of the spider A, alternate apexes of the ring 13 being connected with the arms 5 of the spider B.

The other three apexes of the ring 11, 13, respectively, each incorporate a vane-block 10, 12, respectively, extending radially with respect to the ring.

The vane-blocks 10, 12 are of wedge-shaped profile, the wedge apex being turned towards the centre of its respective ring 11, 13.

The pads in each ring are integrally moulded and vulcanized in a mould in which their respective spider and vane-blocks have been accommodated before the rubber blend is injected into the mould.

The vane-blocks are each formed with a pair of holes 17, 18 having their axes situated in a plane extending through the axis of the ring 11 and parallel to the said axis.

Similarly, the vane-blocks 12 are each formed with a pair of holes 19, 20 having their axes situated in a plane extending through the axis of the ring 13 and parallel to the said axis.

The vane-blocks 10, 12 are secured to the sides of the plane 14, respectively, by means of bolts 22 extending through the holes 18 and 20 in the vane-blocks 10 and 12 and the holes 16 in the plate 14 and by means of pins 21 forced into the holes 15 in the plate 14 and into the holes 17 and 19 in the vane-blocks 10 and 12. The bolts are screwed into the holes 18 in vane-blocks 10.

The mutual distance of the holes in each vane-block is equal to the radial spacing of the apertures 15, 16 in the plate 14. However, it will be seen from FIGURES 4 and 6, as compared with FIGURE 2, that the original configuration of each of the polygonal rings 11, 13 is irregular in that the apexes incorporating the vane-blocks are spaced from the centre of the ring through a distance greater than the corresponding distance of the apexes incorporating the spider arms. More particularly, referring to the original configuration of the rings, a radially inward displacement of each of the vane-blocks is required in order to bring the two holes therein into axial alignment with their corresponding apertures 15, 16 in the plate 14 on assembly of the joint. As will be readily understood, this radial displacement on assembly results in a pre-compression of each of the rubber pads between its respective vane-block and spider arm, as is deducible from FIG. 2. The wedged shape of the vane-blocks is very effective under this aspect.

Figure 1:
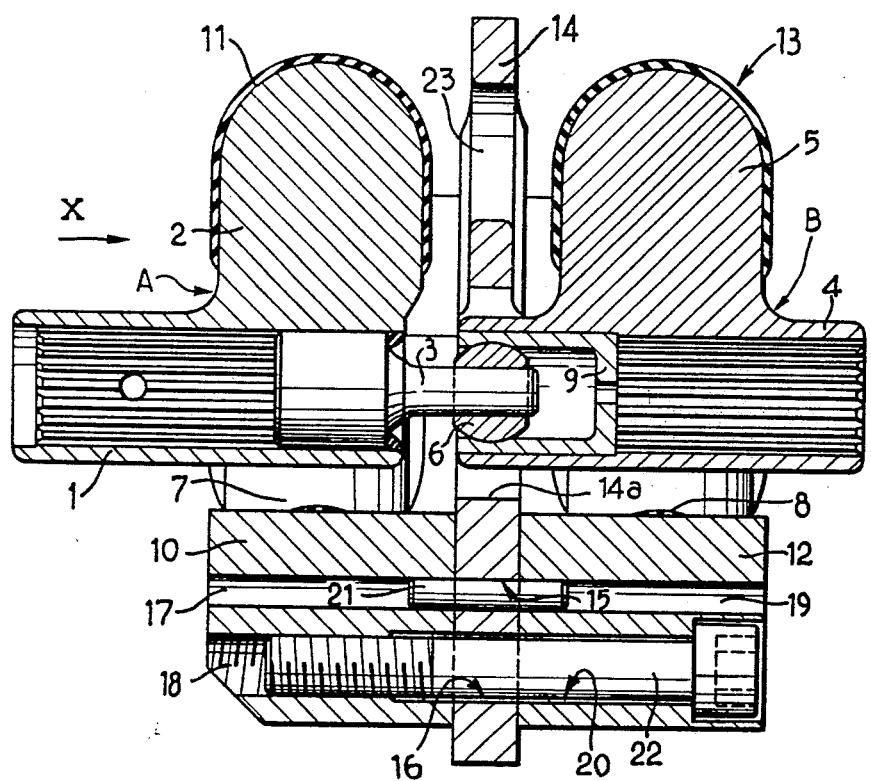
FIGURE 1 is an axial sectional view of an embodiment of the invention.

In the condition shown in FIG. 1 both the stud 3 and socket 9 protrude into the central aperture 14a in the plate 14 and the ball-member 6 is situated (approximately, at least) in the plane of the plate; the protruding parts have a relatively wide freedom of movement in said central aperture without interfering with the plate in angled condition of the joint. Owing to the so placed ball and socket connection, the plate 14 is maintained substantially on the plane bi-secting the shaft angle (i.e. the angle formed by the axes of the hubs 1 and 4), whereby the two joints sections interconnected by the plate operate in mutually balanced conditions, in which the two sections are practically equally stressed.

In the modified plate 14' shown in FIG. 7 (wherein reference numerals 15, 16 are still used to denote the apertures for the pin 21 and bolt 22, respectively), interference of spider-arm ends with the plate in angled condition of the joint is prevented by a substantially triangular design of the plate, the sides 24, of which have been relieved to a concave shape to a depth sufficient to avoid the interference.

What we claim is:

1. A twin joint for resilient transmission of torque comprising: a rigid plate perpendicular to the axis of the joint; a pair of spiders adjacent the opposite faces of the plate having vane-shaped spider arms, in an arrangement wherein each arm on a spider is aligned with its respective arm on the other spider in axial direction in the inoperative condition of the joint; a pair of through-apertures in the plate in a location angularly mid-way between each pair of mutually aligned spider arms, the apertures in each pair of apertures extending on a common axial plane of the joint; a pair of rigid vane-blocks removably applied against the opposite faces of the plate in each of said locations to extend from their respective faces in axially opposite directions between the respective spider arms, the vane-blocks in each pair being formed with a pair of axially directed holes aligned with respective apertures in the plate; means rigidly fastening each pair of vane-blocks to the plate, said means comprising a bolt screwed through a hole in a vane-block and through the respective aperture into the respective hole in the other vane-block in the pair thereby to clamp the plate between the vane-blocks, and a locking-pin extending from the remaining hole in a vane-block into its aligned hole in the other vane-block through the aperture in the plate aligned with the last-named holes whereby the vane-blocks in each pair are prevented from incidentally rotating about their clamping bolt; and a pair of polygonal rings or elastomeric material at the opposite sides of said plate for resiliently transmitting torque between their respective spiders and plate, each of said rings consisting of a polygonal series of elastomeric pads integrally moulded and vulcanized on the respective spider arms and vane-blocks whereby each of said spiders forms together with its associated pads and vane-blocks a unitary structure; each of said pads being pre-compressed between its respective spider arm and vane-block in the assembled condition of the joint; and said plate being relieved in zones between each pair of mutually aligned spider arms thereby to avoid interference between the plate and arms on angling of the joint.

2. A twin-joint for resilient transmission of torque comprising: a rigid plate perpendicular to the axis of the joint; a pair of spiders adjacent the opposite faces of the plate having vane-shaped spider arms, in an arrangement wherein each arm on a spider is aligned with its respective arm on the other spider in axial direction in the inoperative condition of the joint; a pair of through apertures in the plate in a location angularly mid-way between each pair of mutually aligned spider arms, the apertures in each pair of apertures extending on a common axial plane of the joint; a pair of rigid vane-blocks removably applied against the opposite faces of the plate in each of said locations to extend from their respective faces in axially opposite directions between the respective spider arms, the vane-blocks in each pair being formed with a pair of axially directed holes aligned with the respective apertures in the plate; means rigidly fastening each pair of vane-blocks to the plate, said means comprising a bolt screwed through a hole in a vane-block and through the respective aperture into the respective hole in the other vane-block in the pair thereby to clamp the plate between the vane-blocks, and a locking-pin extending from the remaining hole in a vane-block into its aligned hole in the other vane-block through the aperture in the plate aligned with the last-named holes whereby the vane-blocks in each pair are prevented from incidentally rotating about their clamping bolt; and a pair of polygonal rings of elastomeric material at the opposite sides of said plate for resiliently transmitting torque between their respective spiders and plate, each of said rings consisting of a polygonal series of elastomeric pads integrally moulded and vulcanized on the respective spider arms and vane-blocks whereby each of said spiders forms together with its associated pads and vane-blocks a unitary structure; each of said pads being pre-compressed between its respective spider arm and vane-block in the assembled condition of the joint; said plate being relieved in zones between each pair of mutually aligned spider arms thereby to avoid interference between the plate and arms on angling of the joint and being formed with a central aperture; a socket axially extending from one of the spiders into said central aperture, and a ball member in said socket carried by the other spider; said socket and ball member providing a mutual centering means for the spiders.

References Cited
UNITED STATES PATENTS

| | | | |
|---|---|---|---|
| 1,626,195 | 4/1927 | Hiller | 64—13 |
| 3,238,742 | 3/1966 | Martorana | 64—11 |
| 3,293,882 | 12/1966 | Boschi et al. | 64—14 |
| 3,293,883 | 12/1966 | Boschi et al. | 64—14 |
| 3,304,743 | 2/1967 | Paulsen | 64—11 |

HALL C. COE, *Primary Examiner.*